US008239826B2

(12) United States Patent
Elenburg et al.

(10) Patent No.: US 8,239,826 B2
(45) Date of Patent: Aug. 7, 2012

(54) AUTOMATING MODULAR MANUAL TESTS INCLUDING FRAMEWORK FOR TEST AUTOMATION

(75) Inventors: Dennis W. Elenburg, Sachse, TX (US); Judith Keeley, Winchester, MA (US); Robert B. Levy, Watertown, MA (US); Francis J. McGrath, Wellesley, MA (US); Mark T. Metheny, Shirley, MA (US); René D. Morrow, Salem, MA (US); William C. Tobin, Chelmsford, MA (US); Mark F. Victory, Westford, MA (US); Steven W. Walton, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 1519 days.

(21) Appl. No.: 11/375,330

(22) Filed: Mar. 13, 2006

(65) Prior Publication Data

US 2006/0253742 A1 Nov. 9, 2006

Related U.S. Application Data

(63) Continuation-in-part of application No. 11/026,145, filed on Dec. 30, 2004.

(60) Provisional application No. 60/588,865, filed on Jul. 16, 2004, provisional application No. 60/678,562, filed on May 6, 2005.

(51) Int. Cl.
*G06F 9/44* (2006.01)

(52) U.S. Cl. .......................... 717/115; 717/110; 717/125

(58) Field of Classification Search .......... 717/110–117, 717/124–135

See application file for complete search history.

(56) References Cited

U.S. PATENT DOCUMENTS 7,581,212 B2 * 8/2009 West et al. .................... 717/136

OTHER PUBLICATIONS

Rational Software Corporation, "Rational® Robot—User Guide", 2003, chapters 1-18, and Appendix A, 353 pages.*

* cited by examiner

*Primary Examiner* — Ted T Vo
(74) *Attorney, Agent, or Firm* — Hamilton, Brook, Smith & Reynolds, P.C.

(57) ABSTRACT

An automation framework for automation of modular scripts based on a method for automating a script step in a modular script is provided. In accordance with one embodiment of the invention, the method comprises preparing a software environment for automation; performing one or more user actions on a software product executing on a computer system, the actions being representative of the script step that is to be automated, while the computer system records the user actions such that the modularity of the modular script is retained and the script step is automated; and providing user input to the computer system indicating that all the user actions have been performed. The modular script may be a modular test script prescribing test script steps that test a software product. Script steps that are shared by a large number of modular scripts and that are affected by a change to a corresponding software product need to be re-automated or updated only once, leading to automatically updated modular scripts that share the updated script steps.

20 Claims, 11 Drawing Sheets

AUTOMATING MODULAR MANUAL TESTS INCLUDING FRAMEWORK FOR TEST AUTOMATION

RELATED APPLICATION

This application claims the benefit of U.S. Provisional Application No. 60/678,562, entitled "Automating Modular Manual Tests including Framework for Test Automation," filed on May 6, 2005. The application is also a continuation-in-part of U.S. application Ser. No. 11/026,145, entitled "System and Method for Software Product Test Modularization," filed on Dec. 30, 2004 which claims the benefit of U.S. Provisional Application No. 60/588,865 filed on Jul. 16, 2004. The entire teachings of the above applications are incorporated herein by reference.

BACKGROUND OF THE INVENTION

When the user interface of a piece of software undergoes significant change, all corresponding tests of the software have to be updated to reflect the changes.

Commonly software testing is repetitive and involves execution of large numbers of test script documents. These documents, and subsequent automated recordings, share many common flows, for example, setting up the application under test (e.g., launch log in) and filling out forms (e.g., create customer account).

Traditional test automation via record-playback techniques misleads many testers into recording separately each instance of a common flow found in the many test script documents leading to significant content duplication. Moreover, updating content duplication reflecting software changes requires separate re-recording of each instance of such an automated flow. Content duplication renders traditional test automation via record-playback tedious, prone to human error, and generally inefficient. This inefficiency is the root cause that prevents the majority of software testers in the Enterprise IT marketplace from sustaining automation across multiple software releases.

Conventional test automation frameworks are an alternative. These include keyword driven approaches and require large upfront investment before yielding any return on investment.

Thus a new method and framework for test automation is needed that allows both efficient use of common flows and low upfront investment costs, as well as accessibility to less technical users.

SUMMARY OF THE INVENTION

The present invention provides a solution to the problems of the prior art. One embodiment of the invention is a method for automating a script step in a modular script, comprising the steps of preparing a software environment for automation; performing one or more user actions on a software product executing on a computer system, the actions being representative of the script step that is to be automated, while the computer system records the user actions such that the modularity of the modular script is retained and the script step is automated; and providing user input to the computer system indicating that the subject user actions have been performed.

Preferably, the invention method is used to automate a test script step in a modular test script. Both manual as well as previously automated script steps can be automated, that is, re-recorded in the latter case.

In another related embodiment, the method for automating a script step in a modular script is used to automate one or more, or even all script steps in the same modular script such that the modular script is partly or entirely automated with modularity retained.

The method of the present invention allows users, including non-programmers, to automate modular scripts to a chosen degree with modularity of the automated modular scripts being retained. Automated script steps can be re-used within a modular script or while creating a new modular script. Content duplication is prevented, because modularity is retained. Upfront investment costs are low and return is immediate, because the automation framework allows gradual modular automation with focus on the most commonly re-used flows first, and non-programmers who make up the majority of the Enterprise IT are supported.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

The majority of software product testers author their test content in-line, leading to significant test content duplication using traditional test automation via record-playback. This makes both the development of new software tests as well as the maintenance of existing software tests tedious and prone to human error. Conventional automation frameworks, including keyword driven approaches, require large upfront investment before yielding any return on investment.

The invention disclosed herein is based on the insight that modular scripts prescribing a set of manual script steps, created using for example the invention disclosed in U.S. patent application Ser. No. 11/026,145, provide an ideal framework or template for modular automation without content duplication.

In the field of software product testing, a system for software product modularization, such as IBM Rational Manual Tester, enables non-programmers to write test scripts with repeated flows (i.e., each repeated flow includes one or more consecutive script steps that can be used repeatedly in one or more modular scripts, also referred to as "subflow", "reusable content" and "reusable statements") reused as linked content according to the invention disclosed in U.S. patent application Ser. No. 11/026,145. These test scripts are hereinafter referred to as "modular test scripts".

Figure 1:
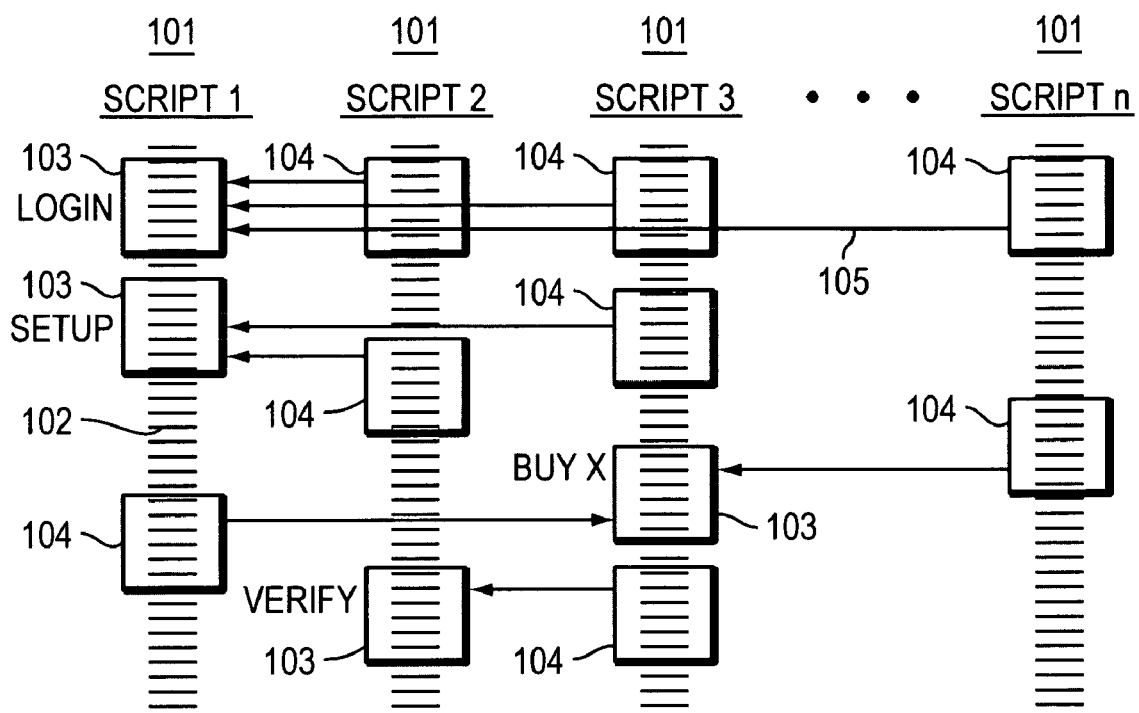
FIG. 1 is a schematic view showing several modular test scripts with repeated flows linked as reusable content.

FIG. 1 illustrates the concept of modularity. It presents several modular scripts 101 (i.e., script 1, script 2, ..., script n), each containing a number of steps (hereinafter "script steps") that are shown as lines (e.g., 102), and a number of repeated flows 103 and repeated flows 104, the latter being linked (e.g. 105) to the former such that flows are repeated, reused, or shared. Repeated flows can be reused between modular scripts or within the same modular script.

A user may create modular test scripts (i.e., modular scripts 101 used for testing a software product executing on a computer system) by using visual scripting, that is, by using familiar user interface gestures, such as drag/drop and copy/paste to create test script steps that are duplicated in multiple places in a software test. IBM Rational's User Interface makes it easy to write modular test scripts regardless of skill level.

The use of modular scripts 101 is not limited to the field of software product testing. They could, for example, also be used beneficially in the field of consumer product testing, for example, testing of logic controls in various electronic devices, electromechanical devices, imaging systems and the like. Additionally, they are not limited to the application of testing. They could, for example, be used for the preparation of oral presentations using software based slides. In the latter case, a modular script 101 corresponds to a presentation and each manual script step 102 within the modular script 101 corresponds to one or more slides within the presentation. Changes to a slide that is shared by several presentations, for example, a slide presenting current market shares, is updated in all presentations once the slide is updated in any one of the presentations. Accordingly, the invention disclosed herein is not limited to software product test automation.

Different applications of modular scripts 101 have different potential for automation. The field of software product testing has a particularly strong need for automation. Commonly, manual test steps (hereinafter "manual test script steps") contained in a test script for a manual test of a software product represent, describe or involve more than one action on the side of a user, tester or test team (hereinafter referred to as "user"). For example, the simple manual test script step of entering a URL in a web browser application executing on a computer system, may involve the following user actions: moving the pointer to the URL field, selecting the URL field, entering an URL in the field, and selecting the enter key. Because testing a software product commonly involves a large number of test scripts, each of them containing a large number of test script steps that represent a large number of user actions that a user performs manually in order to test a software product, there is a strong need and large potential for automation.

Compared to conventional test automation frameworks, automation based on modular scripts 101 as disclosed herein provides the significant advantage of modularity without content duplication within a simple visual scripting framework for creation and modification of modular scripts 101. The user can focus his automation efforts on the most important modular test scripts, most frequently reused groups of test script steps, that is, repeated flows, or most frequently used test script steps.

With every modular test script or test script step that is automated or updated (herein also re-recorded or re-automated), a large number, possibly in the thousands, of other partly or even fully automated modular test scripts are created or updated automatically. Whenever the user performs a software test using a modular test script and encounters a manual test script step or an automated test script step that needs to be automated or updated, the user, preferably, immediately automates or updates the script step.

The automation framework provided by the invention disclosed herein allows a user to automate gradually according to importance while maintaining a maximum of functionality of all modular scripts 101. The automation framework guides the user through the modular script 101, and allows automation without the need for programming skills on the side of the user. Thus, the invention disclosed herein applied to the automation of modular test scripts, especially those authored using tools implementing the techniques disclosed in U.S. patent application Ser. No. 11/026,145 enables non-programmer testers and business analysts to create resilient, framework-based automation while providing practically immediate return of investment.

A modular script 101 as referred to herein is a document containing one or more script steps 102, linkable by reference, at the destination, to the source of the content, as disclosed in U.S. patent application Ser. No. 11/026,145

Script steps 102 can be either manual or automated. Initially, that is, before any script step 102 in any modular script 101 has been automated using the invention disclosed herein, each script step 102 is a manual script step, that is, a script step for which a user himself provides one or more user actions to a computer system during "execution" of a modular script containing that script step.

A user action (hereinafter also "action") is any input that a user can provide to a computer system, for example, a program command, selecting a software application to be launched, data entry, or selecting software application functionality.

After a manual script step has been automated using a system for software product modularization and automation according to the invention disclosed herein, it is an automated script step. For automated script steps, a system for software product modularization and automation can play back one or more user actions that were provided by the user and recorded by the system during automation.

The invention method for automating a script step 102 in a modular script 101 can be used to automate a part or the entirety of a modular script 101.

Figure 11:
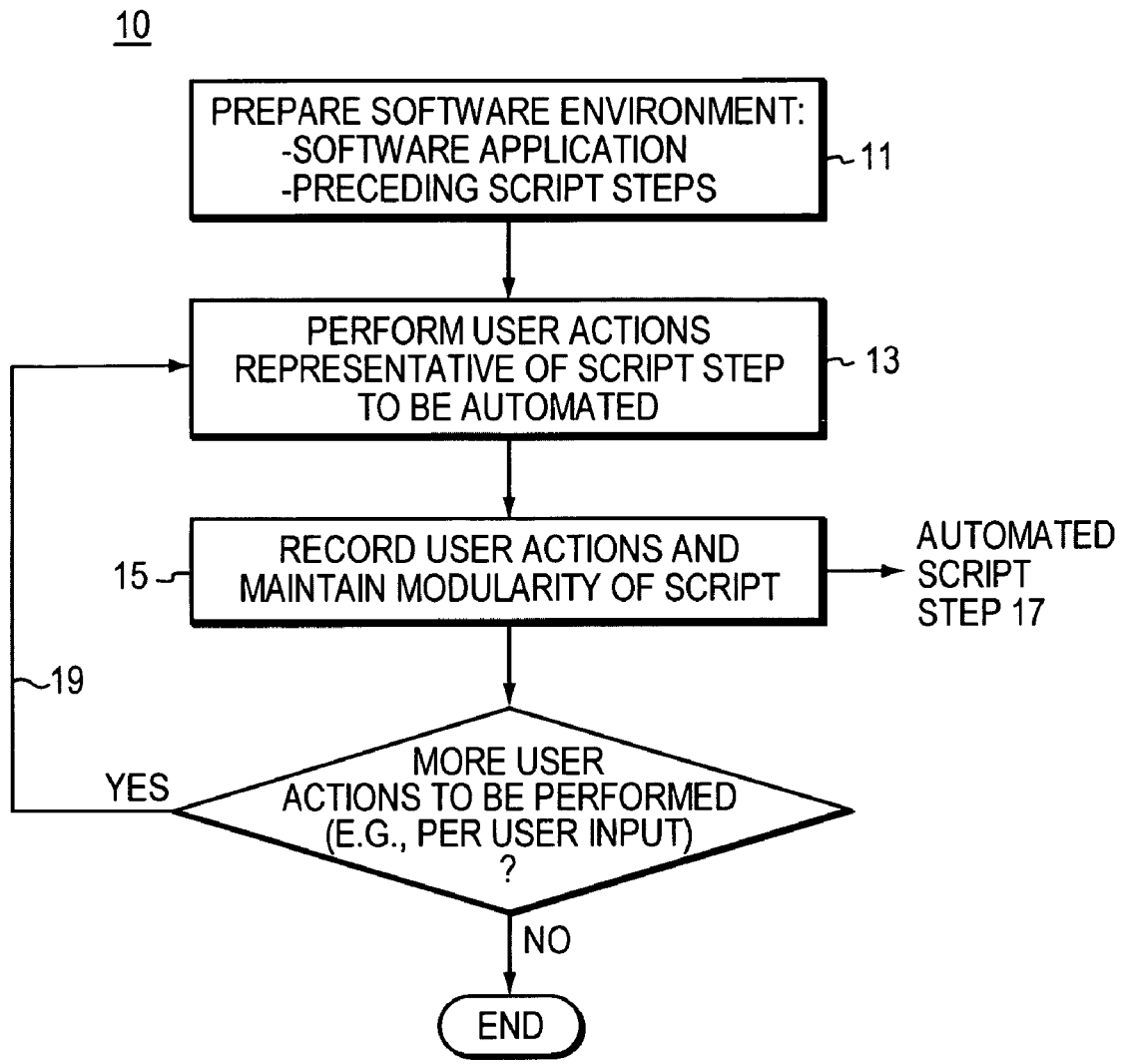
FIG. 11 is a flow diagram of an embodiment of the present invention.

According to one embodiment of the invention, a method or system for automating a script step 102 in a modular script 101 includes the process 10 illustrated in FIG. 11. The process begins at 11 with preparing the software environment for automation. Next process 10 at 13 and loop 19 performs one or more user actions on a software product executing on a computer system. The user actions are representative of the script step (e.g. 102) that is to be automated, while the computer system records (at 15) the user actions such that the modularity of the modular script 101 is retained and the script step (e.g. 102) is automated (output 17). Near the end of the process 10, user input is provided to the computer system indicating that the subject (or generally process 10) user actions have been performed.

Preferably, the method is used to automate tests of a software product (hereinafter also "software", "software application", or "software product application"), that is, the script step that is to be automated is a test script step contained in a modular script that is a modular test script.

A script step that is to be automated can either be a manual script step or a script step that was previously automated using the methods disclosed herein. In the latter case the script step to be automated is re-automated or updated.

A modular script 101 that contains only manual script steps is a manual modular script. A modular script that contains at least one but not only automated script steps is a partly automated modular script, and a modular script that contains only automated script steps is an automated modular script.

A script step 102 can represent a variety of content, as mentioned above, for example, it can represent an electronic slide in an electronic presentation. In the preferred case of software product testing automation, a test script step can be, but is not limited to, an action step, a data-driven action step, a verification action step, and other action-related steps.

An action step as referred to herein, is a script step representing one or more actions that a user performs on a software product executing on a computer system to achieve a change in the state of the software application, for example, launching a web browser or entering a URL. Testing of a software application executing on a computer system commonly requires user actions of entering data into a software application under test, that is, a data-driven action step, and user verification that the information or change of state of the software application under test matches expectations, that is, a verification action step.

Commonly, data entry fields of a software application need to be populated with more than one, often hundreds or more sets of data. This data-driven step can be supported by a data entry feature, such as the one included in IBM Rational's Functional Tester, that allows a user using a spreadsheet-like data editor to create or import customized data sets to be inserted into the script during playback. An aspect of the invention disclosed herein is that it allows, additionally, to automate the linking between the fields of a software application that have to be populated and the corresponding customized data sets such that the data-driven action step is fully automated and can be played back without necessitating the user to act either on the software application or on the invention system for software modularization and automation.

In the present invention, automation of a script step starts with the preparation of the software environment (Step 11, FIG. 11). The extent of preparation is dependent on the state that the software environment is in at the time that a script step is to be automated. If neither a software application to be acted on nor a system for software product modularization and automation is running, preparing a software environment for automation may comprise (i) launching the software application to be acted on; and (ii) launching a system for software product modularization and automation. The software application and the system for software product modularization and automation are not limited to execute on the same computer system. They can, for example, execute on different computer systems within a computer network. The software application can be, for example, a web application that is to be tested and the system for software product modularization and automation is a software application that includes software tools for the creation, deletion, organization, and manipulation of modular scripts and is the software basis for the invention disclosed herein.

If the script step that is to be automated represents user actions that result in launching the software application, that is, launching itself is part of testing the software application, the software application is preferably not launched.

If both, a software application to be acted on and a system for software product modularization and automation are executing at the time that the method of automating a script step is to be performed, preparing a software environment for automation may comprise providing a script step that is to be automated. This situation arises in many embodiments for a further (i.e., second, third, etc.) script step to be automated if a user chooses to automate more than one script step. Providing a script step to be automated can be achieved, for example, by opening any modular script that contains the script step to be automated. Preferably, opening of any such modular script is done from within the system for software product modularization and automation. In a related embodiment of the invention the script step to be automated may be provided within a repeated flow, for example, within a favorite or reuse sub window of a graphical user interface. In a related embodiment of the invention, providing a script step to be automated comprises creating one or more new manual script steps using the techniques disclosed in U.S. patent application Ser. No. 11/026,145. Providing a script step to be automated is not limited to the before mentioned cases. For example, if a modular script containing several script steps has been opened in a system for software modularization and automation and any script step has been automated, the succeeding script step in the modular script, if any, may be automatically taken as provided. This is in many embodiments the case if consecutive script steps are automated, particularly, if an entire modular script is automated.

A first test script step in a modular test script may represent user actions that test launching of a software application as mentioned above, but it is not limited to this representation. A first test script step may also represent one or more user actions that can only be performed by the user if the software application is in the correct state to support performing of the user actions. For example, if a first test script step prescribes to fill out a login form of a web application, the web application has to be in the state that provides the login form to the user. To bring the software application into the correct state, user actions such as launching a web browser and entering the URL of the web application must be performed. Generally, the user has several options if user actions represented by a test script step that is to be automated are not supported by the current state of the software application. The user may bring the software application manually and without the help of a system for software modularization and automation into the correct state for automation. The user may open from within the invention system a modular test script that contains test script steps that allow bringing the software application from within the invention system into the correct state, if such a modular test script exists and the user knows about it. Or, preferably, the user points out the test script step to be automated to the invention system for software product modularization and automation and the invention system determines a modular script that contains test script steps that can bring the software application into the correct state for automation.

According to a related embodiment of the invention the user may choose to automate a manual or automated script step that is part of a repeated flow within a reuse or favorite list of script steps. In this case, the system for software product modularization and automation may automatically open a modular script that contains the chosen script step such that the script step is provided. The system may open, among all of the modular scripts that contain the chosen script step, the modular script that allows bringing the corresponding software application most efficiently into the correct state for automating the chosen script step. In one embodiment of the invention the system for software product modularization and automation opens the modular script with the smallest number of script steps preceding the chosen script step. In a further embodiment of the invention, it opens the modular script with the smallest number of manual script steps preceding the chosen script step. Preferably, it weighs factors determining the chance to bring the corresponding software application into the correct state for recording and chooses the modular script that is accordingly the most likely to bring the software application fastest into the correct state. Factors that one embodiment of the invention system considers for each modular script containing the chosen script step are the number of preceding manual and automated script steps necessary to bring the software application from a current state into the correct state for automation, the dates that the automated script steps were automated, and any previously measured and saved times for performing each script step.

Using the system for software product modularization and automation to bring a software application into the correct state is preferred, particularly, if some of the script steps that are used to bring the software application into the correct state for automation are automated ones. If each of the script steps is an automated one, it is possible that the user brings the software application into the correct state using played back user actions only. Accordingly, the step 11 (see FIG. 11) of preparing a software environment for automation may comprise bringing the software application into a state that supports performing one or more user actions representative of the script step that is to be automated.

Once the software application is in a state that supports performing any script steps outlined in the modular script 101 that precede the subject script step that is to be automated, the invention brings the software product into a state immediately prior to the subject script step by performing any script steps outlined in the modular script that precede the subject script step that is to be automated. That is, preceding script steps in the modular script are performed to bring the software application into the correct state for automation of the subject script step.

Each preceding script step that is to be performed is either a manual or an automated script step. In both cases the system for software product modularization and automation may expect the user to indicate a script step to be performed. If the script step that is to be performed is a manual one, the user acts in accord with the invention disclosed in U.S. patent application Ser. No. 11/026,145 and first indicates to the system for software product modularization and automation the manual script step that is to be performed and than performs the corresponding user actions on the software application. The user actions normally bring the software application into a state that supports performing the next preceding script step, either manual or automated, in the modular script, while the invention system provides any feedback representative of the user actions to the user. In this way the user performs each manual script step that precedes a subject script step that is to be automated.

If the script step that is to be performed is an automated one the user can either choose to proceed manually as described above or proceed with automated means. In the latter case, the system for software product modularization and automation plays back previously recorded user actions represented by the automated script step. The system for software product modularization and automation may provide feedback representative of the user actions that it played back and their success in changing the state of the software application. In this way the user performs each manual script step that precedes a subject script step that is to be automated.

Feedback, representative of the user actions, to a user as a consequence of performing a manual script step may comprise providing visual cues. Visual cues may indicate the current position in a modular script. A visual cue may, for example, be a red line below a script step that has been performed last.

Feedback, representative of the user actions, to a user as a consequence of performing an automated script step comprises at least one of providing playback status information or providing visual cues. Visual cues may indicate the current position in a modular script. A visual cue may, for example, be a red line below a script step that has been played back last. Playback status information may comprise playback status messages. These may inform a user whether playback was successful or not, and if not, may inform about reasons for the outcome.

Feedback, representative of the user actions, to a user as a consequence of performing a script step while the user actions are being recorded comprises at least one of providing automation status information or providing visual cues. Visual cues may be, for example, a red dot superimposed on an identifier symbol indicating that the referenced item has been recorded, displaying a red line below a last script step that was automated such that the current position of automation is indicated, or using visual scripting indents. In a related embodiment providing automation status information is at least one of providing an automation status message, displaying an action identifier text, displaying an action identifier symbol, or displaying an automation identifier symbol.

An action identifier is any text, symbol, or a combination of both that allows identification of a user action, for example, the text "button click". Feedback may indicate that at least one user action was not played back successfully, for example, the user action could not be played back at all, or the playback of the user action left the software in an unexpected state. Feedback may also indicate that the playback of one or more previously recorded user actions was successful.

An automation identifier symbol can be any symbol representing the automation that was undertaken, for example, a symbol identifying the successful automation of a data-driven step.

One reason that playback of a user action may be unsuccessful is that the software application changed since the automated script step representing the user action was automated. This is one of the major reasons why software application testing is done in the first place. The modular automation framework provided by the present invention has the advantage that any automated script step that leads to at least one unsuccessfully played back user action needs to be re-automated only once. All modular scripts that share this re-automated script step are updated automatically. In the case that the system performs a preceding automated script step unsuccessfully, the user may re-automate the script step representing user actions that were played back unsuccessfully, or bring the software application into the correct state to either proceed with the next script step outlined in the modular script. Preferably, the user re-records immediately the previously automated and unsuccessfully performed user actions.

According to the steps outlined above, the user is guided and paced through the script steps that precede the subject script step that is to be automated. Concerning user's choice between bringing the software application without and with the guidance of a system for software modularization and automation into the correct state for automation of a script step, it is strongly preferred that the user choose the latter. Using the modular script and a system for software product modularization and automation is more efficient, particularly, if part or all of the script steps in the modular script preceding the script step that is to be automated have previously been automated using the methods disclosed herein. Even if all of the script steps preceding the script step to be automated are manual ones, using the modular script and a system for software product modularization and automation is preferred, because it provides the opportunity to automate these preceding manual script steps with little more effort than manually bringing the software application into the correct state.

Once the software application has been brought into the correct state for automation of a script step, preparing the software environment for automation (step 11, FIG. 11) may further include starting recording by selecting the corresponding record-playback functionality of the system for software product modularization and automation. This may include selecting a record button, or launching a recording toolbar. Starting recording may be necessary if the script step that is to be automated is the first script step that the user aims to automate in an automation session. Preferably, the user automates more than one script step, and most preferably the user automates all script steps in a modular script. Accordingly, the user may often automate a second, third or further script step. For a succeeding script step, the user may not have to start recording, because the recording capability is still executing. Starting recording is usually necessary if the software environment has otherwise been prepared for automation and the recording tool is not yet executing. If a sequence of script steps is to be automated, the recording capability in one embodiment is started only once preceding the first script step to be automated unless recording is stopped between script steps that are to be automated. Additionally recording may be paused and resumed. Also, recording may include creating code in a scripting language. Preferred scripting languages are JAVA and Visual Basic .NET. Recording may further comprise saving (i.e., storing in working or other memory) the automation results.

Once the software environment is prepared (step 11, FIG. 11) for automation of a subject script step that is to be automated, a user performs one or more user actions (step 13, FIG. 11) on a software product executing on a computer system. The computer system records (step 15, FIG. 11) the user actions such that the modularity of the modular script is retained and the script step is automated (output 17, FIG. 11). In a related embodiment, the step 13 includes receiving user input indicating the script step that is to be automated, providing any feedback representative of the user actions to the user, or both.

Part of the recording process (step 15, FIG. 11) is that a system for software product modularization and automation automatically creates an object map of user interface details of the software application that is tested while the user performs the user actions. This object map stores information needed during automated test execution (i.e., automated execution of an automated modular script) in one convenient place. Changes to existing user interface details thus no longer require the user to revise each modular test script. The tester can make revisions in one place since the automated modular scripts reference this centralized object map.

ScriptAssure™ (manufactured by IBM and disclosed in the following US Patent Applications: U.S. patent application Ser. No. 10/745,821, entitled "Fuzzy Location of a Testable Object in a Functional Testing Tool," filed on Dec. 23, 2003; U.S. patent application Ser. No. 10/746,536, entitled "Disambiguating Like Testable Objects in a Functional Testing Tool," filed on Dec. 23, 2003; and U.S. patent application Ser. No. 10/745,822, entitled "Locating a Testable Object in a Functional Testing Tool," filed on Dec. 23, 2003; the entire teachings of these applications are incorporated herein by reference) further advances this technique by applying a matching system to find the best reasonable match within customizable thresholds for changed user interface detail. This capability safeguards test scripts from modest user interface revisions typical from build-to-build.

The feedback representative of the user actions is any output of the system for software product modularization and automation that informs the user about the current state of the automation, including the state of the software product that is to be acted on and the state of the system for software modularization and automation itself. Feedback may include error messages and success messages. Preferably, the system for software product modularization and automation provides feedback by displaying one or more action identifier texts, providing visual cues, or both. Most preferred is a combination of action identifier texts and visual cues. The system for software modularization and automation may associate action identifier texts automatically with the actions taken by a user. For example, if a user selects to launch a web browser by clicking (selecting) the corresponding icon, while the system for software modularization and automation is recording, the system may by itself associate a simple action identifier such as "button click" with its recording. Such a text may then be provided with other visual cues to the user, for example, by displaying the action identifier text with a visual scripting indent below a script step text of the corresponding script step.

Visual cues may comprise at least one of displaying one or more automation identifier symbols, displaying one or more action identifier symbols, or using visual scripting indents. Automation identifier symbols may be, for example, a red dot or a check mark, preferably, displayed near the corresponding displayed action identifier text. For example, a red dot or a check mark next to an action identifier text "button click" may mean that the action was recorded successfully.

By providing script step and user action identifier texts, for example, by displaying them within a graphical user interface with drag and drop functionality, non-specialist users and non-programmers get simple feedback regarding the automation process and the capability to drag and drop automated script steps and their corresponding actions in order to create new modular scripts.

Once the user has provided the user actions representative of the subject script step that was to be automated, the user provides user input to the computer system including the system for software modularization and automation indicating that such user actions have been performed, that is, the user indicates the end of process 10 in FIG. 11. The user input may be user's selection of a "stop record button" or an indication that a further script step is to be automated, that is, an indication that the user intends to automate a further subject script step using the process 10 of FIG. 11. This further script step may be the directly succeeding script step, and the user only needs to select the corresponding script step identifier text to provide sufficient indication to the system for software modularization and automation.

Once each script step that the user chose to automate has been automated, the user saves the automation results. However, the system for software modularization and automation may also save results automatically.

Figure 2:
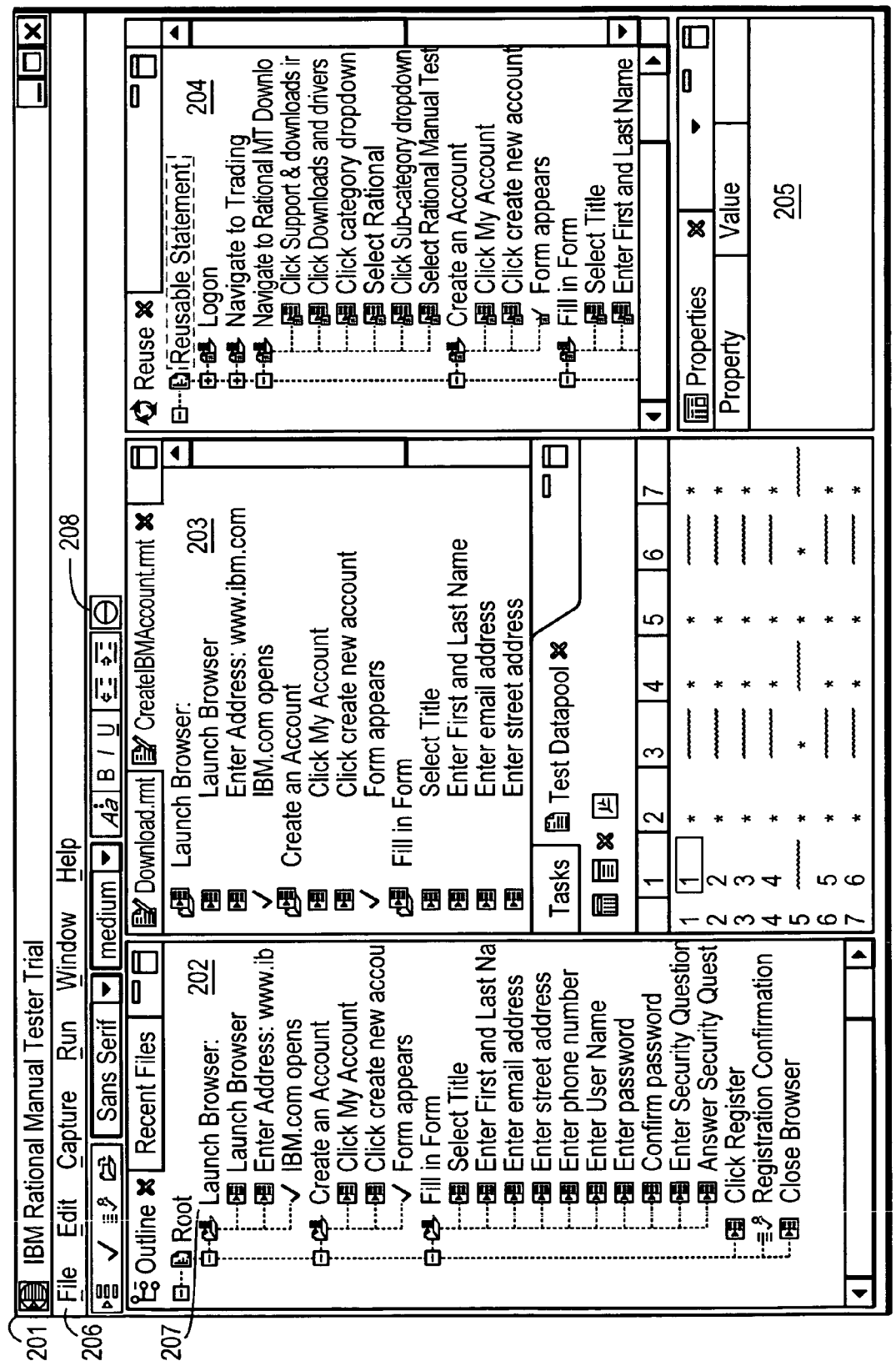
FIG. 2 is a schematic view showing a user interface that may be used to implement embodiments according to the invention and a manual modular test script that is to be automated in its entirety.

FIG. 2 shows a user interface 201 that may be used in an implementation of a system for software product modularization and automation providing a basis for the methods of the invention disclosed herein. An outline sub-window 202 provides a summary of each test script step of the modular test script in terms of their test script identifier texts contained in an editor sub-window 203, which acts as a user editor for the modular test script. Whereas the test script steps in terms of their test script identifier texts are listed in the editor sub-window 203, the outline sub-window 202 uses plus and minus symbols to allow test script steps that are organized in the form of sub-routines to be expanded, to show the test script steps in terms of their test script identifier texts within the sub-routine; or contracted, to show only the summary name of the sub-routine. A reuse or favorites sub-window 204 acts as a holding bin, for each machine on which an embodiment according to the invention is used, of test script steps and repeated flows, both manual and automated ones that are re-usable. Such a technique has strong "link" and "browser" analogies, which assists in user familiarity with the system. Test script steps in terms of their test script identifier texts may be copied/pasted or dragged/dropped, as a link, in order to facilitate re-use. One or more test script steps in terms of their test script identifier texts may be selected and linked from the outline sub-window 202 to the editor sub-window 203 or vice versa; from the outline sub-window 202 to the reuse sub-window 204 or vice versa; or from the editor sub-window 203 to the reuse sub-window 204 or vice versa. A properties sub-window 205 allows a user to manage the custom properties and values for a currently selected test script step in the editor sub-window 203.

As an example of the method for automation of script steps (e.g. 102) and modular scripts 101 as disclosed herein and as example for the use of the user interface of FIG. 2 as part of a system for software product modularization and automation, a user may open a previously created modular test script by using an "Open File" functionality in a drop-down menu accessible by selecting "File" 206. The user in this example aims to automate an entire manual modular test script that is provided and shown in the outline sub-window 202. Because the first manual test script step with test script identifier text "Launch Browser" 207 corresponds to user actions that open the software application that is to be tested in the succeeding test script steps, and since the software for software product modularization and automation is executing, the one task to be done in order to prepare the software environment for automation (step 11, FIG. 11) is to start recording. The user starts recording by selecting the "Record button" 208.

Figure 3:
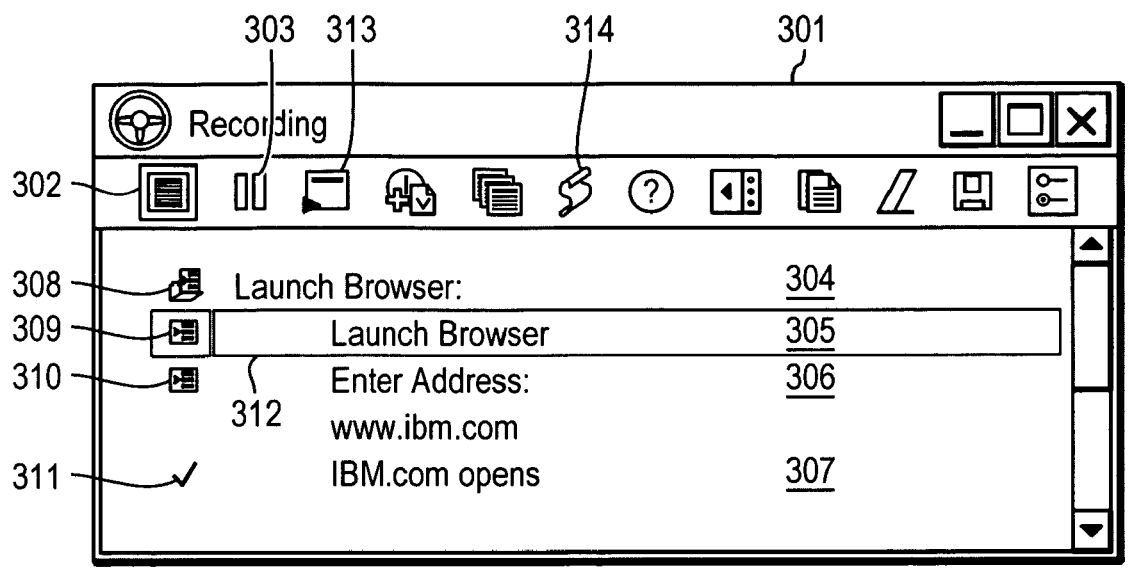
FIG. 3 is a schematic view showing a recording toolbar that may be used to implement an embodiment according to the invention and the functionality of the recording toolbar for automating a test script step.

In turn this launches a recording toolbar 301 shown in FIG. 3. The recording toolbar 301 provides control over the automation and recording process. For example, the user may configure and start a software application that is to be tested using a "Configure and Start Application Feature" 313, the user may insert script support commands using the "Insert Script Support Command" feature 314. Recording can also be stopped by selecting a "Stop Record Button" 302, and can either be paused or resumed by selecting a "Pause/Resume Record Button" 303. The recording toolbar 301 also displays the script step identifier texts for the available test script steps (e.g., 305, 306, and 307) and the corresponding summary names for any sub-routines, for example 304. It also displays script step identifier symbols. Script step identifier symbol 308 identifies a sub-routine summary name representing one or more manual test script steps. The symbols 309 and 310 identify manual test script steps, and symbol 311 identifies a manual verification step. Because the user did not indicate a test script step that is to be automated, the system 10 (see FIG. 11) takes the first test script step as selected and highlights the corresponding test script identifier text 312. The user then performs user actions representative of the prescribed manual test script step. In this case, the user launches Microsoft Internet Explorer by clicking the icon representing the same, while the system 10 records the user action into the selected test script step such that modularity of the modular test script is retained and the test script step is automated.

Figure 4:
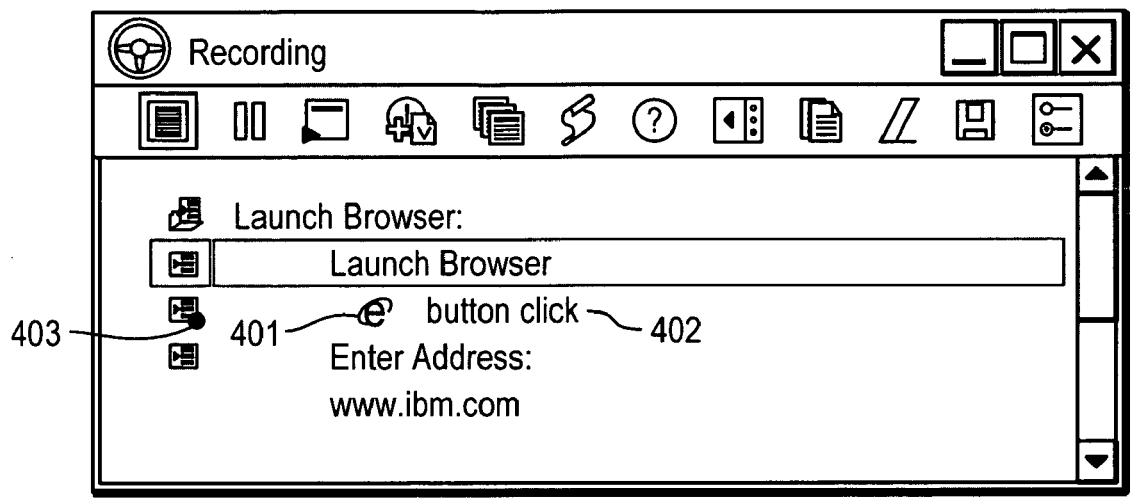
FIG. 4 is a schematic view showing a feedback functionality of the recording toolbar of FIG. 3 as a consequence of the recording of a user action representative of a test script step selected for automation.

The system 10 also provides feedback to the user as shown in FIG. 4. In this case, feedback is provided in terms of an automation identifier symbol, that is, a dot 403 indicating what has been recorded, and a combination of action identifier symbol 401 and text 402, that is, the Microsoft Internet Explorer symbol 401 in combination with "button click" 402. Also, note the visual scripting indents as an example of helpful visual cues.

Once the user has performed the user actions represented by the subject script step that is to be automated, the user provides user input to the system 10 indicating that all user actions have been performed.

Figure 5:
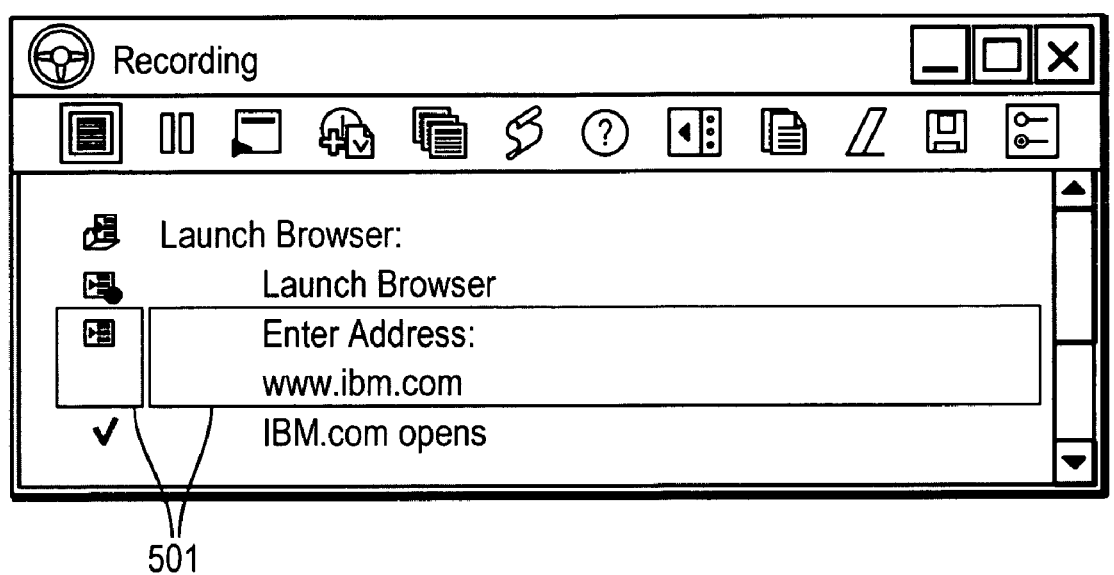
FIG. 5 is a schematic view showing a user selection of a test script step to be automated using the recording toolbar of FIG. 3.

In FIG. 5, the user indicates that he has performed all user actions for the test script step "Launch Browser" by selecting the test script step identifier text "Enter Address www.ibm.com" for the succeeding subject test script step that is to be automated. In turn this causes the test script step identifier text to be highlighted 501. The user than enters the URL, that is, "www.ibm.com" in the URL field of the launched Microsoft Internet Explorer as prescribed by the selected test script step. Meanwhile the system 10 records the user action, that is, data entry into the selected test script step such that modularity of the modular test script is retained and the test script step is automated. As above the system 10 provides feedback and the user selects the next test script step.

Figure 6:
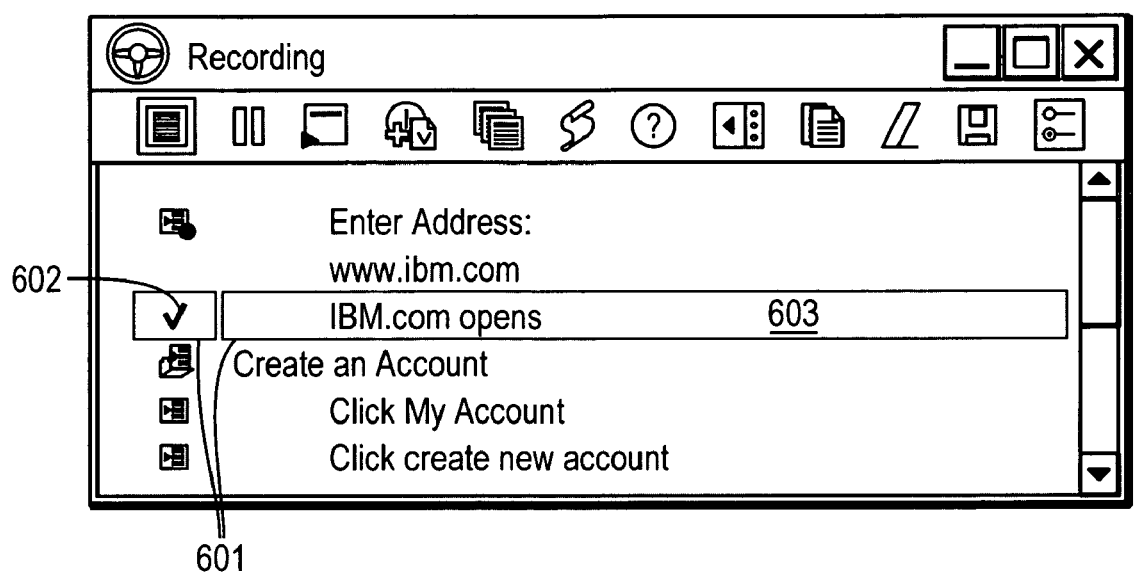
FIG. 6 is a schematic view showing a user selection of a verification step that is selected to be automated using the recording toolbar of FIG. 3.

In this example, the next selected test script step as shown in FIG. 6 is a verification step 601 identifiable by the script step identification symbol 602 and the test script step identifier text 603. That is, the system 10 expects the user to verify that an expected change in the state of the software application that was acted on resulted due to the performing of preceding test script steps. The user verifies that the IBM webpage opened as expected and the system 10 records the expected state of the software application, that is Microsoft Internet Explorer with the IBM webpage loaded, such that the test script step is automated with modularity of the modular test script being retained. In this way the user is guided through the test script steps contained in the modular test script until the user reaches the end of the modular test script, that is, the last test script step.

Figure 7:
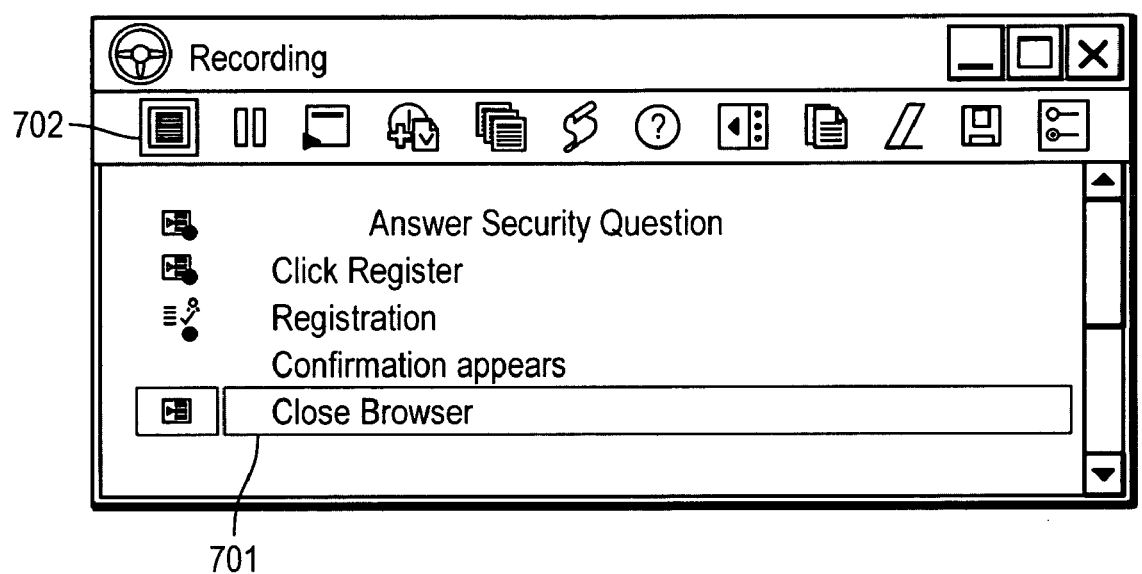
FIG. 7 is a schematic view showing a user selection of the last test script step in a modular script to be automated and the end recording feature of the recording toolbar of FIG. 3.

After the user has performed the last selected test script step "Close Browser" 701 in FIG. 7, in this case representing the user action of closing Microsoft Internet Explorer, the user selects to end automation by selecting the "Stop Record Button" 702. Selecting the "Stop Record Button" also closes the recording toolbar window 301 and activates the main interface shown in FIG. 2 and FIG. 8.

Figure 8:
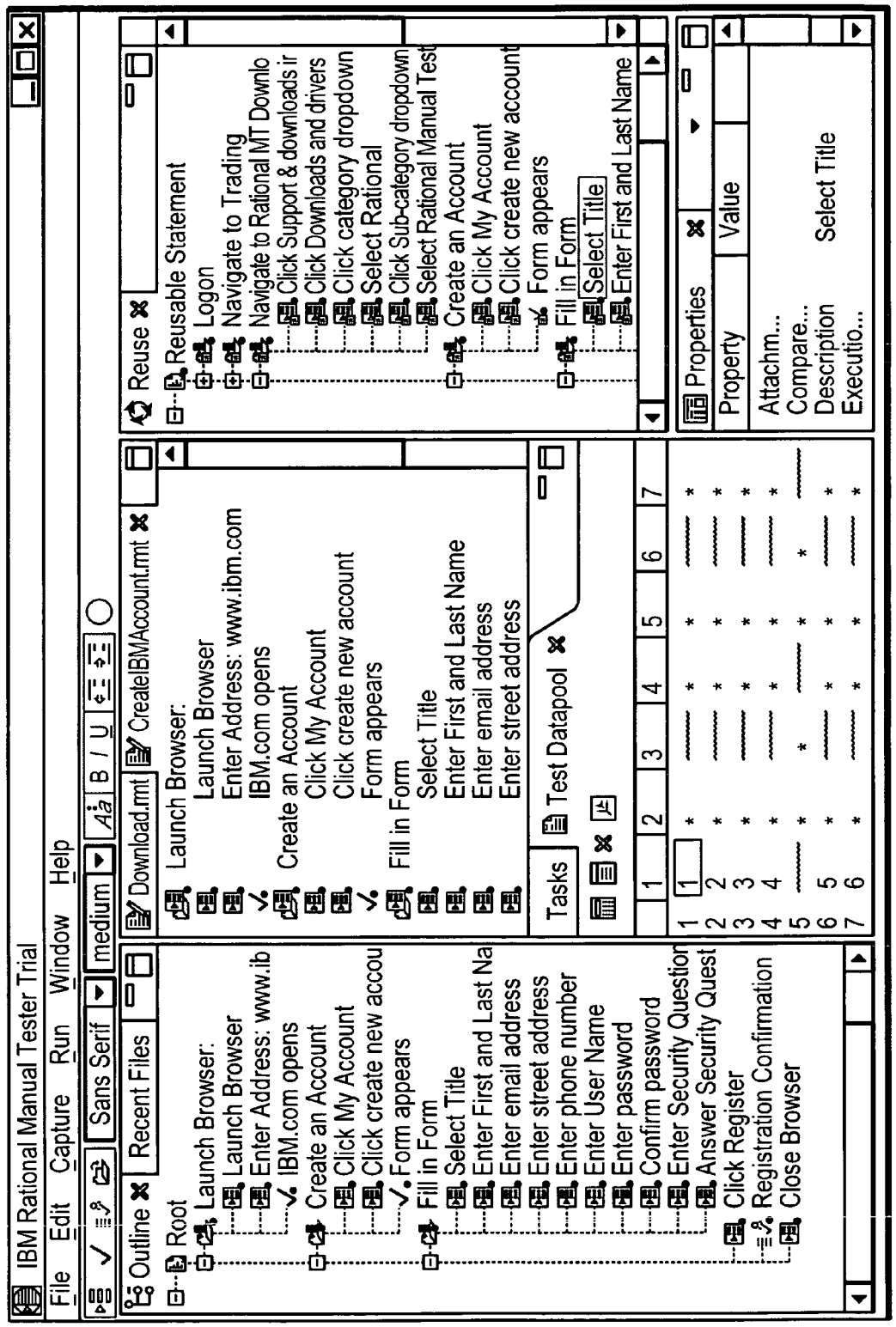
FIG. 8 shows the user interface of FIG. 2 after all manual test script steps contained in the modular test script have been automated.

FIG. 8 displays the state of the system 10 after automation of all test script steps contained in the subject modular test script. Note that all displayed test script step identifier symbols and repeated flow identifier symbols (see Reuse sub-window in FIG. 8) include now a dot indicating that the test script steps and repeated flows are fully automated. As a byproduct of the automation of this one modular test script, all modular test scripts that share one or more of the automated test script steps or repeated flows, can now execute these steps (e.g., "Click My Account") or flows (e.g., "Create an Account") automatically if desired. Also, any automated reusable test script step or repeated flow can be used in creating new modular test scripts such that either a partly or fully automated modular test script is created.

While the preceding section presented an example for using the present invention to automate a manual modular script in its entirety, the present invention is not limited to this embodiment. It will be understood by those skilled in the art that that the present invention can be used, for example, to automate a single manual or previously automated script step, to automate part or the entirety of a manual, partly or fully automated reuse flow, to automate part or the entirety of a manual, partly or fully automated modular script, to update a previously automated script step, reuse flow or modular script that was unsuccessfully played back, to create partly or fully automated reuse flows as visual scripting building blocks for the creation of large modular scripts, and to create a scripting code basis for a programming user. The present invention for automating a script step may be executed in any order with the creation, reuse, modification, deletion, and execution of either a manual or automated script step.

Figure 9:
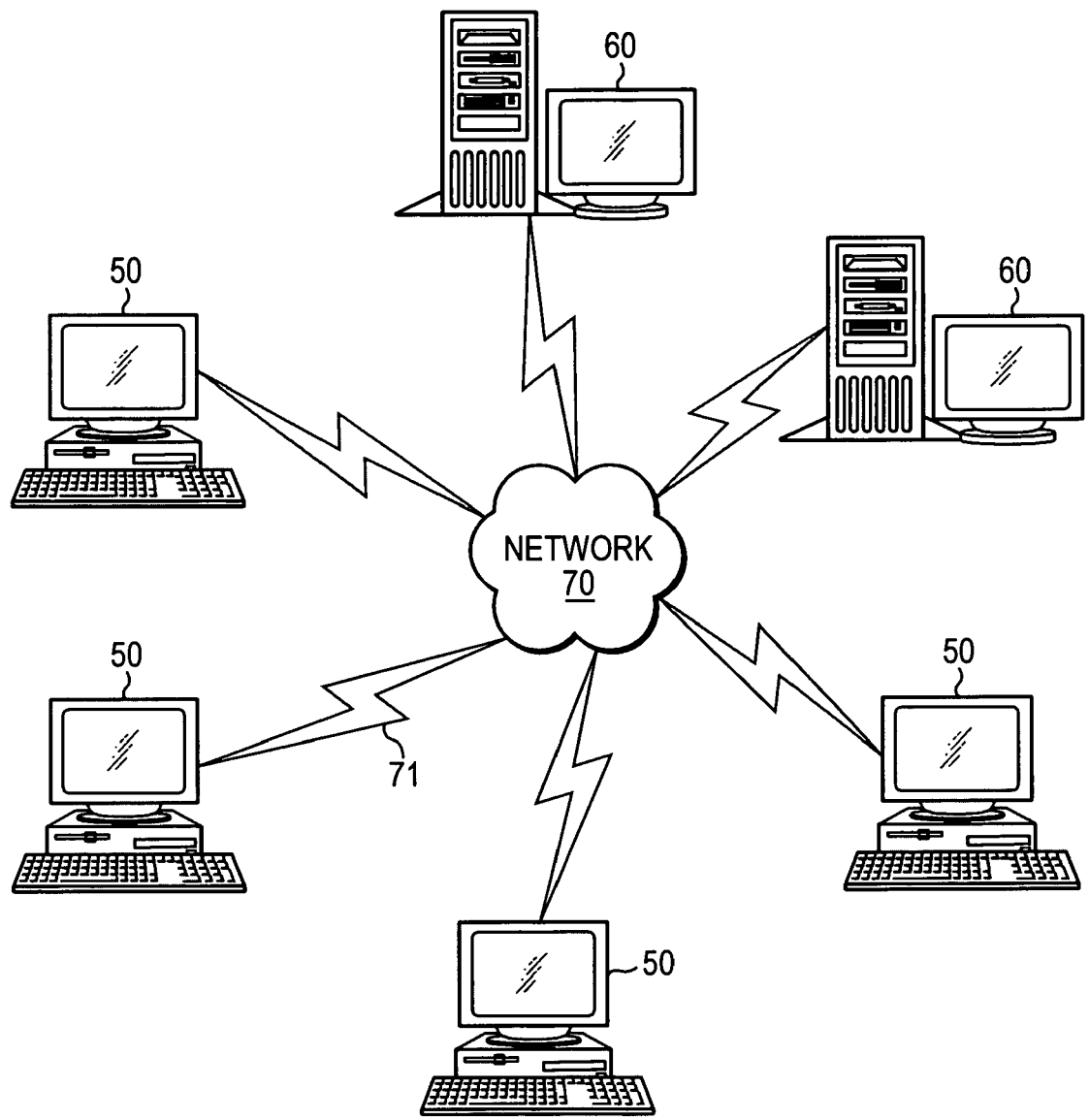
FIG. 9 is a schematic view of a computer network environment in which embodiments of the invention are employed.

FIG. 9 illustrates a computer network or similar digital processing environment in which an embodiment according to the invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 10:
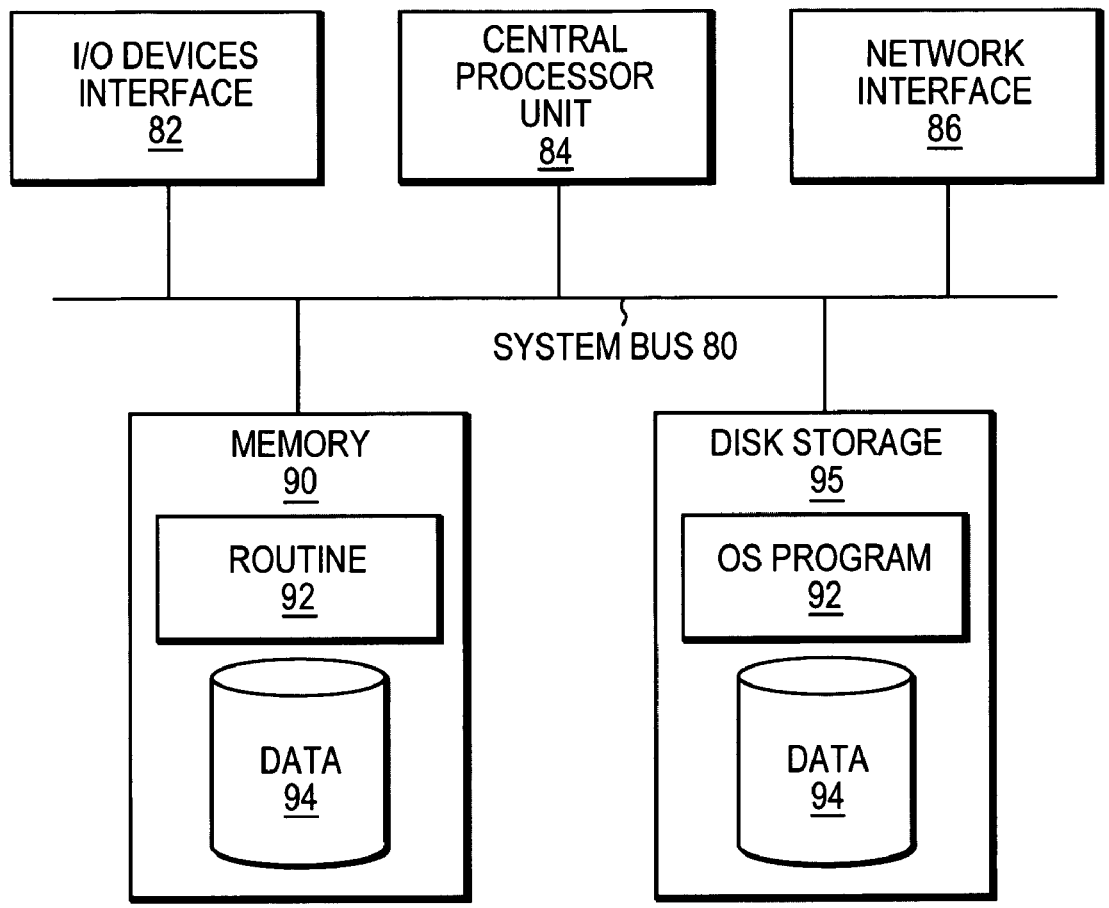
FIG. 10 is a block diagram of a computer from the network of FIG. 9.

FIG. 10 is a diagram of the internal structure of a computer (e.g., client processor/device 50 or server computers 60) in the computer system of FIG. 9, upon which an embodiment according to the invention may be implemented. Each computer 50, 60 contains system bus 80, where a bus is a set of hardware lines used for data transfer among the components of a computer or processing system. Bus 80 is essentially a shared conduit that connects different elements of a computer system (e.g., processor, disk storage, memory, input/output ports, network ports, etc.) that enables the transfer of information between the elements. Attached to system bus 80 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 9). Memory 90 provides volatile storage for computer software instructions used to implement an embodiment of the present invention (e.g., process 10 (see FIG. 11), Program Routines 92 and Data 94, detailed later). Disk storage 95 provides non-volatile storage for computer software instructions 92 and data 94 used to implement an embodiment of the present invention. Central processor unit 84 is also attached to system bus 80 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 71 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals/medium, storage medium and the like.

Various computer program products may be used to enable use of the windows and sub-windows of FIGS. 2-8, in accordance with an embodiment of the invention. For example, standard software techniques for creating and using windows, hierarchies, and similar technologies may be used.

It will also be appreciated by those of ordinary skill in the art that a wide variety of different techniques may be used to implement an embodiment according to the invention. For example, different user interfaces may be used; in fact, the automation framework may be used without reference to a windowed display such as that of FIGS. 2-8. Other modifications may also be made, while remaining within the scope of the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for automating a step in a modular script formed of a plurality of steps, comprising:
    (1) given a modular script having a plurality of steps outlined therein and given a software environment prepared for automation, performing one or more user actions on a software product executing on a computer system, the user actions being representative of a subject step in the given modular script and initially being a manual step that is now the subject step to be automated, said performing being while the computer system records the user actions such that the modularity of the modular script is retained and playback of the recorded user actions provides automation of the subject step; and (2) providing user input to the computer system indicating that user actions have been performed and causing the computer system to stop recording, wherein said modularity being retained preventing content duplication in the given modular script by enabling re-use of the recorded user actions within the given modular script and between modular scripts, and wherein the subject step being used repeatedly in one or more modular scripts defining a repeated flow or a frequently used script step such that upon re-automating the subject step in one place in the given modular script automatically updates the one or more modular scripts and automatically updates the given modular script, resulting in increased efficiency.

2. The method of claim 1 wherein the modular script is a modular test script and the subject step is a test script step.

3. The method of claim 1 wherein the subject step that is to be automated is one of: a manual step such that a step of the given modular script is newly automated, or a previously automated step such that the subject step is re-automated.

4. The method of claim 2 wherein the subject step that is to be automated is one of: an action step, a data-driven step, or a verification step.

5. The method of claim 1 further comprising launching the software product to be acted on; and launching a system for software product modularization and automation.

6. The method of claim 1 wherein the software environment prepared for automation provides the subject step of the given modular script.

7. The method of claim 6 wherein said providing the subject step comprises: opening the given modular script such that one or more steps outlined in the given modular script are made available.

8. The method of claim 1 further comprising starting recording from within a system for software modularization and automation.

9. The method of claim 1 wherein the software environment prepared for automation comprises: bringing the software product into a state that supports said performing of user actions.

10. The method of claim 9 wherein said bringing the software product into a state that supports said performing user actions comprises:

performing any user actions on a software product executing on a computer system, either manually or automated, the actions being representative of any of the plurality of steps outlined in the given modular script that may precede the subject step that is to be automated; and providing to a user any feedback representative of the user actions, in a manner such that a user is paced through the plurality of steps in the given modular script, wherein providing to a user any feedback representative of the user actions comprises at least one of: providing automation status information, or providing visual cues.

11. The method of claim 10 wherein providing automation status information comprises at least one of: providing a playback status message, or providing an automation status message.

12. The method of claim 10, wherein providing visual cues is a least one of: displaying an action identifier text, displaying an action identifier symbol, displaying an automation identifier symbol, displaying a line below a last one of the steps in the plurality of steps that was either played back or automated such that the current position of an automation is indicated, or using visual scripting indents.

13. The method of claim 1, wherein the performing one or more user actions comprises at least one of: receiving user input indicating to pause recording, stop recording, or resume recording.

14. The method of claim 1, wherein recording comprises: creating code in a scripting language.

15. The method of claim 14, wherein the scripting language is at least one of: JAVA, or Visual Basic .NET.

16. The method of claim 1, further comprising: causing a user interface to be displayed, the user interface comprising any combination of an outline sub-window, an editor sub-window, and a reuse sub-window; wherein at least the outline sub-window and the editor sub-window display a representation of the modular script.

17. A method as claimed in claim 1, wherein the steps of performing and providing are repeated to automate some or all of the plurality of steps outlined in the given modular script such that the given modular script is in part or in its entirety automated.

18. A computer system for automating a step in a modular script formed of a plurality of steps, comprising:

means for bringing a software product into a state that supports user actions on the software product;

given a modular script having a plurality of user action steps, means for performing and recording one or more user actions on the software product, the user actions being representative of a subject user action step that is to be automated in the given modular script, the subject user action step initially being a manual step, said means recording performance of the user actions such that the modularity of the given modular script is retained and playback of the recorded performance of the user actions provides automation of the subject user action step; and means for receiving user input indicating that the user actions have been performed and thus stop recording, wherein said modularity being retained preventing content duplication in the given modular script by enabling re-use of the recorded performance of the user actions, re-use being between different modular scripts and within the given modular script, and wherein the subject user action step being used repeatedly in one or more modular scripts defining a repeated flow or a frequently used script step such that upon re-automating the subject user action step in one place in the given modular script automatically updates the one or more modular scripts and throughout the given modular script, resulting in increased efficiency.

19. A computer system as in claim 18 wherein the given modular script is a modular test script and the subject user action step is a test script step.

20. A non-transitory computer program product comprising:

a non-transitory computer readable storage medium including a computer readable program, wherein the computer readable program when executed on a computer causes the computer to:

bring a software product into a state that supports user actions on the software product;

record one or more user actions performed by a user on the software product executing on a computer system, the user actions being representative of a subject step that is initially manual but to be automated and contained in a given modular script, said recording being during user performance of the user actions and being in a manner such that the modularity of the modular script is retained, and wherein playback of the recorded user actions serves as the subject step such that the subject step is automated; and receive user input indicating that subject user actions have been performed and causing the computer system to stop said recording, wherein said modularity being retained preventing content duplication in the given modular script by enabling re-use of the recorded user actions, re-use being between modular scripts and within the given modular script, and wherein the subject step being used repeatedly in one or more modular scripts defines a repeated flow or a frequently used script step such that upon re-automating the subject step in one place in the given modular script automatically updates the one or more modular scripts and throughout the given modular script, resulting in increased efficiency.

* * * * *